United States Patent
Kang et al.

(10) Patent No.: US 7,200,524 B2
(45) Date of Patent: Apr. 3, 2007

(54) SENSOR FAULT DIAGNOSTICS AND PROGNOSTICS USING COMPONENT MODEL AND TIME SCALE ORTHOGONAL EXPANSIONS

(75) Inventors: Pengju Kang, Hartford, CT (US);
Mohsen Farzad, Glastonbury, CT (US);
Slaven Stricevic, Willimantic, CT (US);
Payman Sadegh, Manchester, CT (US);
Alan M. Finn, Hebron, CT (US)

(73) Assignee: Carrier Corporation, Syracuse, NY (US)

( * ) Notice: Subject to any disclaimer, the term of this patent is extended or adjusted under 35 U.S.C. 154(b) by 65 days.

(21) Appl. No.: 10/840,566

(22) Filed: May 6, 2004

(65) Prior Publication Data

US 2005/0251364 A1    Nov. 10, 2005

(51) Int. Cl.
*G06F 3/02* (2006.01)

(52) U.S. Cl. ............. 702/183; 702/179; 702/182; 702/186

(58) Field of Classification Search ........... 702/105, 702/127, 156, 160, 182, 183, 184, 179, 186; 73/719; 700/301; 701/100; 714/745
See application file for complete search history.

(56) References Cited

U.S. PATENT DOCUMENTS

| | | | |
|---|---|---|---|
| 4,848,096 A | 7/1989 | Funahashi et al. | 62/126 |
| 5,469,447 A | 11/1995 | Brunemann, Jr. et al. | 714/797 |
| 5,715,178 A | 2/1998 | Scarola et al. | 702/116 |
| 6,202,038 B1 | 3/2001 | Wegerich et al. | 102/183 |
| 6,343,514 B1 * | 2/2002 | Smith | 73/719 |
| 6,356,857 B1 | 3/2002 | Qin et al. | 702/185 |
| 6,498,992 B1 * | 12/2002 | Toyota et al. | 702/35 |
| 6,598,195 B1 * | 7/2003 | Adibhatla et al. | 714/745 |
| 6,804,600 B1 * | 10/2004 | Uluyol et al. | 701/100 |

FOREIGN PATENT DOCUMENTS

EP    0 217 558    4/1987

* cited by examiner

*Primary Examiner*—Marc S. Hoff
*Assistant Examiner*—Felix Suarez
(74) *Attorney, Agent, or Firm*—Carlson, Gaskey & Olds

(57) ABSTRACT

A method of diagnosing sensor faults for a heating, ventilation and air conditioning system includes the steps of creating a component model for a specific component within the system. The component model is created through the use of commonly available manufacturing data. Data within the system is input into the component model and compared to calculated and predicted values that are also calculated using the identical component models. Differences between the calculated and actual values is determined and compared to a threshold difference value. If the difference exceeds the threshold value, then a fault is detected. The specific type of sensor fault is determined using probability distribution analysis. Each type of sensor fault produces a different type of statistical deviation from normal distribution. By recognizing these patterns of deviations from the normal distribution, the specific type of fault such as electrical, intermittent or freezing of the sensor can be determined to provide initial information as to the severity and type of remedial action required.

24 Claims, 2 Drawing Sheets

SENSOR FAULT DIAGNOSTICS AND PROGNOSTICS USING COMPONENT MODEL AND TIME SCALE ORTHOGONAL EXPANSIONS

BACKGROUND OF THE INVENTION

This invention relates to temperature and pressure sensor fault detection for a heating, ventilation and air conditioning system.

Typically, a heating, ventilation and air conditioning (HVAC) system includes temperature and pressure sensors that are crucial to ensure proper operation of the system. A controller uses data from the sensors to adjust operation of the components such as an evaporator, compressor and condenser. If the sensors fail or are inaccurate, the HVAC system will not operate as intended. Further, if the sensors fail to provide accurate data, the components within the HVAC system may operate outside desirable parameters, potentially causing premature failure. For these reasons, it is desirable to monitor sensor accuracy and indicate a fault condition when sensor accuracy is outside a desired operating range.

Prior art sensor fault detection techniques include the use of redundant sensors to measure the same parameter within the system. The difference of data measured between the two redundant sensors is detected and the difference compared to a threshold value. If the threshold value is exceeded by the actual difference, then a fault is detected and corrective action is initiated.

Systems that use redundant sensors are cost-prohibitive. Further, redundant sensors double the programming requirements and controller requirements, increasing the overall complexity of the system.

Another known prior art system detects pressure sensor faults by subtracting evaporator pressure from condenser pressure. A faulty sensor is indicated if the difference between the pressure sensor at the evaporator and the pressure sensor at the condenser is zero or negative. Condenser pressure should always be higher than pressure within the evaporator and a deviation from this indicates a failure. Disadvantageously, this approach can only detect complete sensor failure. Sensor drift or bias where the sensor provides inaccurate information cannot be detected by such a system.

Another known prior art system uses sensor data to determine a linear relationship that represents a system of statistically related components. A sensor fault is detected by a detected deviation from that linear relationship. This data-driven approach requires a large amount of linearly related data and a statistical analysis that is complicated and computationally intensive. The large amounts of computation can lead to inaccuracies and increased costs.

Accordingly, it is desirable to develop a sensor fault detection method and system that works in real time, uses localized features as well as long-term trending features obtained from data to detect sensor defects, and adapt to current operating systems.

SUMMARY OF INVENTION

This invention is a method of diagnosing sensor faults for air handling systems utilizing component models and statistical analysis to reliably evaluate sensor operating conditions and faults.

A method of this system diagnoses sensor faults by creating component models to predict and determine an expected value for a sensor measurement. The actual sensor data is then compared to the component model and a fault is indicated if a difference between the threshold value and actual measurement exceeds a predetermined value.

The method of this invention also comprises the steps of producing a series of measurement values and producing a probability distribution of sensor values based upon the series of measurements. The probability distribution function that is created based on the measured series of values is then compared to a normal distribution function. A difference between the probability distribution function and a normal distribution function produces data points that are outside the normal distribution function. A time scale transformation procedure is used that produces low and high pass output. The low and high pass output is then compared to a predetermined threshold to diagnose sensor faults.

This system provides an effective and economical sensor fault diagnostic and prognostic technique. This technique is particularly useful for dealing with the slowly occurring sensor faults such as drift and bias in sensor readings. Component models of the air handling system are used as a basis for sensor bias detection and estimation. The combination of the two-fault detection approaches, that being the comparison to component models, and the sensor and data manipulation using statistical techniques, provides a reliable method for evaluating sensor condition.

Accordingly, the method and system of this invention provides a reliable and economical method of determining sensor condition that is adaptable to current systems.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
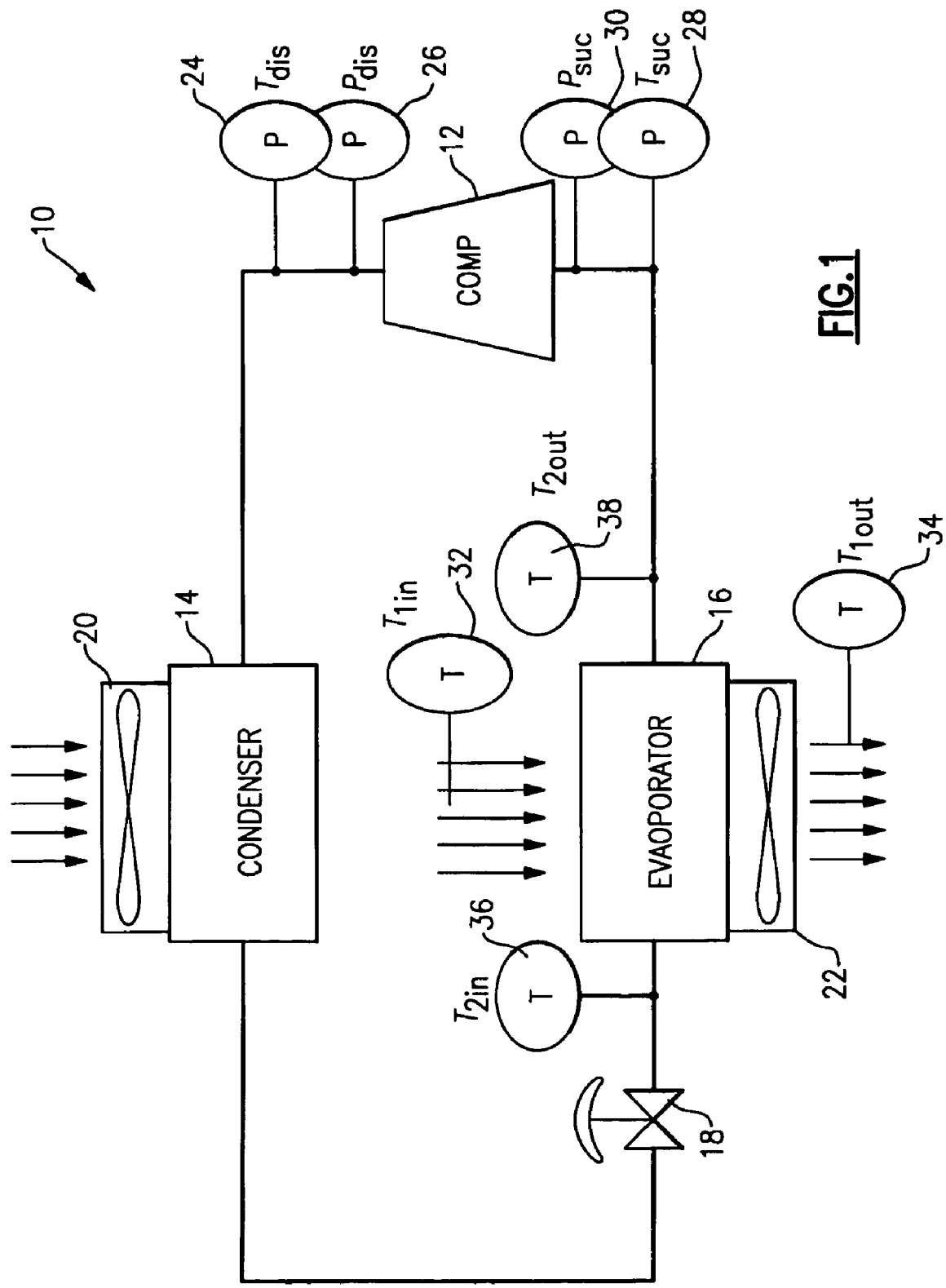
FIG. 1 is a schematic representation of a heat pump system including various sensors.

Referring to FIG. 1, a heat pump system 10 is illustrated and includes a condenser 14, a compressor 12 and an evaporator 16. An expansion valve 18 controls refrigerant flow between the evaporator 16 and the condenser 14. The compressor 12 drives refrigerant to the condenser 14. There are various sensors disposed within the system to measure temperature and pressure of refrigerant, and temperature of air moving in and out of the heat pump system 10. The compressor 12 includes a temperature sensor 24 and pressure sensor 26 that measure the temperature and pressure exiting the compressor 12. On the suction side or inlet side of the compressor 12 is a pressure sensor 30 and a temperature sensor 28.

The evaporator 16 includes temperature sensors 32, 34 that measure inlet and outlet air moving across the evaporator 16. Further, temperature sensors 36, 38 measure refrigerant temperature moving into and out of the evaporator 16.

The pressure and temperature of refrigerant within the system 10 are described by a system of equations that describe the thermodynamics of the system. The thermodynamic operation of a heat pump system 10 is well known and the algebraic equations that describe such a system that relate each of the system parameters to one another are known.

The compressor 12 is preferably a reciprocating compressor where the process of vapor refrigerant going through the compressor 12 is assumed to be polytropic. That means that the compressor, suction and discharge temperature together with suction and discharge pressure are represented by the relationship:

Equation 1:
$$T_{dis} = T_{suc}\left(\frac{P_{dis}}{P_{suc}}\right)^{\frac{n-1}{n}}$$

where $T_{suc}$, $T_{dis}$, $P_{suc}$ and $P_{dis}$ are compressor inlet temperature, outlet temperature, inlet pressure, outlet pressure respectively and n is the polytropic index. A typical value for n is 1.03. The exact value for n could be calculated from manufacturer's data. This relationship provides a model of the operation of the compressor 12. The four sensors 24, 26, 28 and 30 monitor the condition of the compressor 12. Proper functioning of the four sensors 24, 26, 28 and 30 are essential to the reliability of the heat pump system 10. Drifting errors in the sensors 24, 26, 30 and 28 are detected according to this method such that remedial action can be initiated. If the sensors 24, 26, 28 and 30 begin to drift, the compressor component model provided by Equation 1 no longer holds.

Accordingly, the difference between the calculated discharge temperature that is calculated utilizing equation 1 and the actual value dictated by the sensor 24 indicates whether a fault has occurred. If the four sensors are free of defects, the discrepancy should be close to 0. As sensor readings begin to drift away from the modeled or predicted value, a fault is determined and a signal is initiated to prompt maintenance.

Estimation of drifts in the sensors 24, 26, 28 and 30 is accomplished using the following optimization procedure. The optimization procedure is represented by the equation:

Equation 3:
$$\min_{\theta_1 \ldots \theta_4}\left(|T_{dis} + \theta_1| - \left|(T_{suc} + \theta_2)\left(\frac{P_{dis} + \theta_3}{P_{suc} + \theta_4}\right)^{\frac{n-1}{n}}\right|\right)$$

where $\theta_1$, $\theta_2$, $\theta_3$, $\theta_4$ are the bias value of the sensors. Nonlinear optimization techniques known in the art can be used to find the solution of the bias values.

If the two pressure sensors 26, 30 measuring discharge pressure and suction pressures are reading correct values, the model equation should hold at any compressor speed. The model equations for the compressor 12, specifically the two pressure sensors 26, 30 measuring discharge and suction pressure about the compressor 12 are indicated below:

$$\dot{W}_{Comp} = (e+fP_r^d)P_{suc}\dot{V}_{suc}+g,$$

$$\dot{V}_{suc} = A-BP_r^C \quad \text{Equation 4:}$$

where $V_{suc}$ is the compressor suction volumetric flow rate, $P_r$ is the pressure ratio, $P_{suc}$ is the suction pressure, $\dot{W}_{Comp}$ is compressor power, and A, B, C, d, e, f, and g are constants provided by manufacturer's data.

The measured values of the suction pressure and the discharge pressure sensors 26, 30 are utilized in Equation 4, and yield values for volumetric flow rate $\dot{V}_{suc}$ and $\dot{W}_{Comp}$. The calculated $\dot{W}_{Comp}$ is compared to the actual work measured by a power sensor, or a handheld power meter. If the difference between the two values is greater than a predetermined threshold value, then an indication is prompted that one of the pressure sensors is faulty. These discrepancies are measured over time and computed values can be tracked over time. A trending upward or downward in the data for common or stable operating conditions would indicate a drift in data.

For the heat pump system 10, there are always sensors available to monitor performance of the heat exchangers (condenser 14, evaporator 16). Depending on the mode of operation of the heat pump system 10, the condenser 14 and evaporator 16 will ultimately be rejecting or absorbing heat from the surrounding air. Operation of the condenser 14 and evaporator 16 can be modeled as a heat exchanger according to the equations below:

Equation 5:
$$\text{Air side:} \quad Q = \frac{\dot{m}_1 c_{p1}(T_{1in} - T_{1out})}{SHR}$$

Equation 6:
$$\text{Refrigerant side:} \quad Q = \dot{m}_2(h_{r1} - h_{r2})$$

where Q=the rate of heat transfer, $\dot{m}_1$=mass flow rate of air, $\dot{m}_2$=mass flow rate of refrigerant, $c_{p1}$=specific heat of dry air, T=the temperature. SHR=the sensible heat ratio, $h_{r1}$, $h_{r2}$=specific enthalpies of refrigerant vapor at inlet and outlet of the heat exchanger.

The refrigerant enthalpies that flow through the heat exchangers can be obtained from the refrigerant properties using the temperature and pressure measurements. Under a condition where the sensible heat ratio and air mass flow rate are known, the refrigerant flow rate can be solved from the equations 5 and 6 and result in the relationship is:

Equation 7:
$$\dot{m}_2 = \frac{\dot{m}_1 c_{p1}(T_{1in} - T_{1out})}{SHR(h_{r1} - h_{r2})}$$

The refrigerant mass flow rate, on the other hand, can be estimated using a compressor component model. The compressor component model can be obtained from manufacturer's data. A compressor component model provides an approximation of the theoretical volume flow rate through the compressor. This equation is given as:

$$\dot{V}_{suc} = A - BP_r^C \quad \text{Equation 8:}$$

where, A, B, and C are constants that are estimated from the manufacturer's data. $P_r$ is the compressor pressure ratio that is the ratio between discharge pressure and $P_{dis}$ and suction pressure $P_{suc}$. The volumetric flow rate can be obtained using the density of the refrigerant according to the equation:

$$\dot{m}_2 = \dot{V}_{suc}\rho \quad \text{Equation 9:}$$

where ρ is the density of refrigerant. The refrigerant flow rate estimation according to the compressor model should be close to the value that is calculated using the refrigerant enthalpies as is calculated in Equation 7. If there is a fault in the sensors, there will be a large discrepancy between the two calculated volumetric flow rates. Accordingly, if one of the temperature sensors 36, 38 is faulty, this difference will be greater than a desired threshold value.

Further, in order to determine if the sensors are drifting, a sensor bias estimation value is determined by using the following optimization procedure:

Equation 10:

$$\min_{\theta_5 \ldots \theta_8} \left\{ \left| \frac{m_1 c_{p1}((T_{1in} + \theta_5) - (T_{1out} + \theta_6))}{SHR(h_{r1}(T_{2in} + \theta_7) - h_{r2}(T_{2out} + \theta_8))} \right| - \left| \rho(A - BP_r^C) \right| \right\}$$

where $\theta_5$, $\theta_6$, $\theta_7$, $\theta_8$ are bias values in the four temperature sensors 32, 34, 36 and 38 installed on the heat exchanger. The pressure sensors are assumed to be unbiased based on the assumption that biased pressure readings have been corrected. Consequently, only the biases in the temperature readings affect the enthalpies $h_{1r}$ and $h_{2r}$.

The solution of Equation 10 provides a sensor bias estimation value. The bias values of the sensor are compared with predetermined thresholds that if exceeded indicates that bias faults have occurred in the pressure sensors 26, 30. Tracking the estimated bias values over time provides for the prediction of sensor faults. If a bias fault is not serious enough to endanger the integrity of the system 10, that is if the bias value is below the threshold value where a fault is determined, the bias value is input into a statistical database in order to improve and optimize the entire system.

A fault-free sensor provides measured data that provides real values along with a quantity of white noise. White noise is indicative of the interference that accompanies operation and measurement of data through electronic sensors.

The fact that a data series includes measured data plus white noise is used in the statistical analysis of the measured data series. For a defect-free sensor, a probability density function (pdf) of measured data values should be close to a normal distribution. This is so after the removal of deterministic factors by time-scale transformation. As defects begin to develop, the sensor will produce unique features that appear in the measured data series that can be utilize to detect the specific type of fault. For example, drift and bias faults have low frequency characteristics while intermittent faults, such as an occasionally open short circuit, exhibit high frequency fault features. Time scale transformation techniques are utilized to analyze data and isolate both low and high frequency features that are produced by a data series from a faulty sensor. Preferably, a wavelet transformation of the data series is produced to provide a series of low pass and high pass data elements. These low pass and high pass data elements are revealed within the wavelet transformation and used to detect the specific types of fault.

If wavelet transformation is applied to measurements of a defect-free sensor, high pass output of wavelet transformation will be close to a normal distribution with a zero mean. Because the wavelet transformation is a linear transformation procedure that preserves the probability density function of the original signal, the distribution should be normal with a zero mean. The low pass output of the wavelet transformation should be a normal distribution with a mean value that corresponds to the mean value of the physical quantity of the sensor. In other words, the low pass output should be, for a defect-free and properly operating sensor, a normal distribution with a mean value that is the same as the mean value for the actual measured data. Any variance of the high pass output from the normal distribution and from the mean value that is common to the mean value of the measured data indicates that the sensor is defective. Deviation of the low pass output from a normal distribution and a mean value common to the measured mean value indicates a bias, freezing, or loss of accuracy within the sensor.

A sensor defect with intermittent faults that generate periodic high frequency data points are identified within the signal. The time scale transformation is sensitive to local changes in the signals and measurement data from the sensors. The result of this high sensitivity is that more coefficients of higher amplitude will be produced. The increased amount of higher amplitude or high pass output that is produced by the time scale transformation causes the probability distribution function to deviate from a normal distribution. When the probability distribution function of the time scale transformation deviates from a normal distribution, this change in high pass output indicates that a sensor is undergoing an intermittent defect. This intermittent defect within the sensor can indicate that the sensor has some type of electrical fault, or the signal is either being interfered with by external electronic noise or simply is physically freezing.

Figure 2:
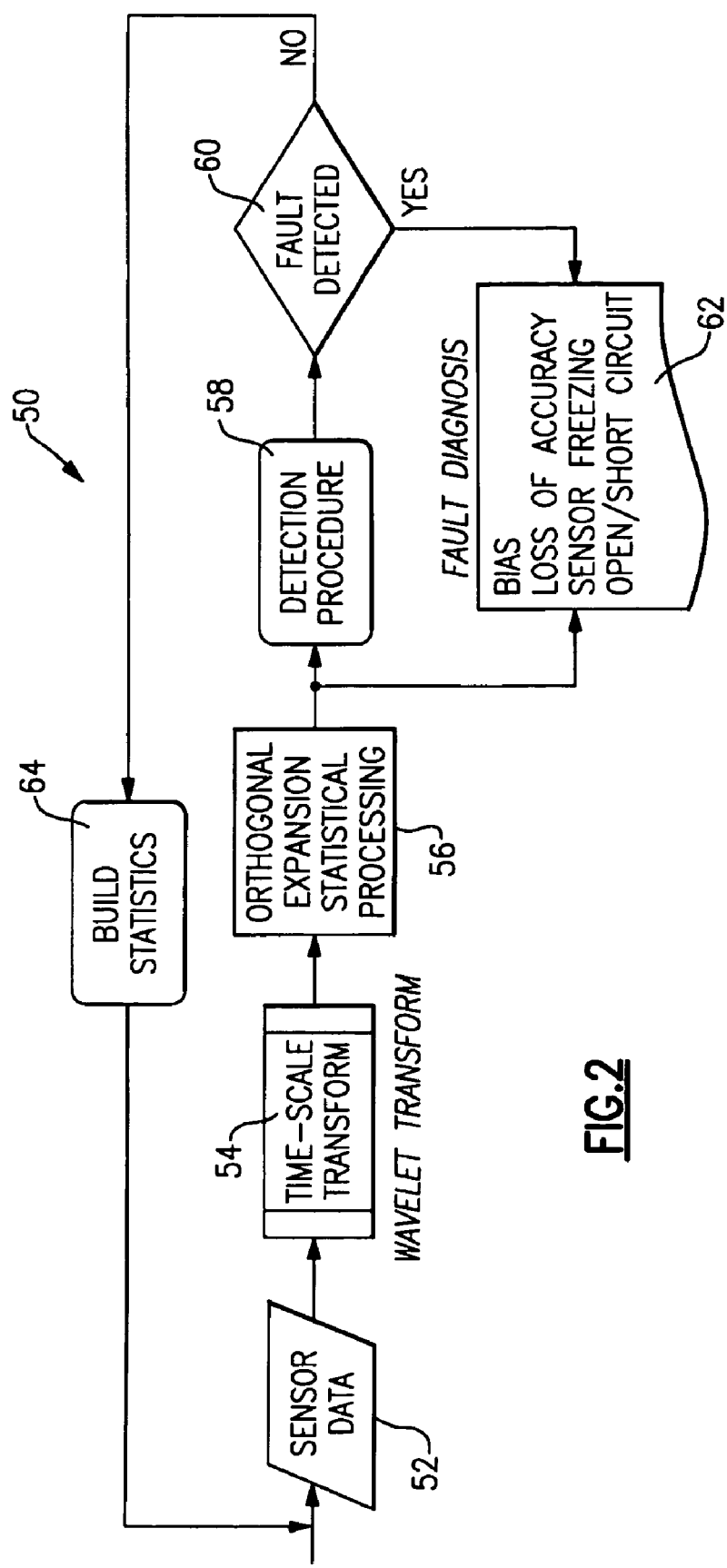
FIG. 2 is a block diagram illustrating the steps of the method of this invention.

Referring to FIG. 2, the method of sensor fault diagnosis is indicated and schematically illustrated by the flow diagram 50. The method of sensing and diagnosing sensor faults for an HVAC system includes the steps of collecting data from a sensor, represented as block 52. This data is collected and then input into a microprocessor controller. The microprocessor controller can be as is known to a worker skilled in the art. Further, a worker skilled in the art with the benefit of this disclosure will understand how to program the commercially available micro controller to implement this invention and read sensor data.

Each of the sensors is analyzed to provide an indication of the condition of that sensor. The sensor data, represented by the block 52, is input into the system and stored within a database. The data stored within the system then undergoes the time scale transformation process. Preferably, the time scale transformation used is a wavelet transformation that decomposes the gathered data into low pass and a high pass output. A statistical analysis is then performed on the output as is indicated at block 56. This statistical analysis is performed on low pass output to determine whether statistical measures such as the mean, variance, and higher order moments have changed from the data that had been previously gathered. In other words, as each data point or set of data points is accumulated, it is compared to some or all of the previous set of data points that have been compiled. As additional data is accumulated and used to build the statistical data of the system, that new data is compared to the older, previously gathered data to determine any differences. Change detection is then carried out on the low pass contents to determine whether there has been a change.

Further, statistical analysis is also performed on a high pass output to determine whether it has changed statistically from the mean, variance, or higher order moments that were compiled previously gathered data.

Once the statistical analysis has been performed of the low pass and high pass output that is produced from the measured data, a pattern recognizer carries out self-diagnosis. The pattern recognizer is a component within the controller that is programmed according to pre-determined criteria to identify statistical features that are present within the output distribution functions for each of the sensors.

Specific fault types are identified as a recognizable pattern within the gathered data. The fault type can include electrical faults such as bias and drift of the sensor, or mechanical faults such as freezing or intermittent operation often caused by a short circuit or an open circuit. Accordingly, the specific fault of the sensor as indicated at block 62 can be identified to provide instruction as to what remedial action is required to correct the fault.

Statistical analysis is accomplished using expansion techniques as indicated at 56. Preferably, an orthogonal statistical expansion technique is utilized. Known orthogonal statistical expansion techniques include the Gram-Charlier (GC) orthogonal expansion that is preferably utilized in this method. Other expansion techniques as known in the art are also within the contemplated scope of the invention. The basic idea of the GC expansion is that any probability distribution function can be approximated by a standardized normal distribution function and residual terms as is shown in the equation:

Equation 11:

$$pdf(x) = \phi(x) + r(x) = \phi(x)\left(1 + \sum_{i=1}^{\infty} c_i H_i(x)\right)$$

where $\phi(x)$ is the standardized normal distribution function and $r(x)$ is the residual of the expansion. $H_i(x)$ is the Hermite function of $n^{th}$ degree, and $c_i$ is the CG expansion coefficients, which can be calculated by:

$$c_i = \frac{1}{i!}\int_{-\infty}^{\infty} pdf(x)H_i(x)dx$$

where i! means i factorial.

If the sensor is in good working order, the data measured and obtained from that sensor should be normally distributed. Defects within the sensor cause data to deviate from a normal probability distribution function. In the practical application of the CG expansion, a limited number of residual terms are used. For an 8-term expansion, the coefficients of the GC expansion can be calculated as:

Equation 12:

$$\begin{bmatrix} c_0 = 1, c_1 = 0 \\ c_2 = \frac{1}{2}(m_2 - 1) \\ c_3 = \frac{1}{6}m_3 \\ c_4 = \frac{1}{24}(m_4 - 6m_2 + 3) \\ c_5 = \frac{1}{120}(m_5 - 10m_3) \\ c_c = \frac{1}{720}(m_6 - 15m_4 + 45m_2 - 15) \\ c_7 = \frac{1}{5040}(m_7 - 21m_5 + 105m_3) \\ c_8 = \frac{1}{40320}(m_8 - 28m_6 + 210m_4 - 420m_2 + 105) \end{bmatrix}$$

where $m_k$ is the $k^{th}$ order moment of x around the mean. The $k^{th}$ order moment is defined by the relationship indicated below:

Equation 13:

$$m_k = \frac{1}{N}\sum_{i=1}^{N}(x(i) - \overline{x})^k$$

where $\overline{x}$ is the mean of the sensor data samples x(i), i=1, 2, . . . , N.

Generally, odd statistical moments indicate information about peak density of the distribution. Even moments indicate characteristics of the spread of the distribution. GC expansion coefficients contain the information about both odd and even moments of the probability distribution function of the data values and as a result, GC expansion is more sensitive to the changes than using conventional orthogonal expansions. An additional useful feature of the GC expansion is that a detection statistic can be formulated from the GC expansion co-efficient giving a single Chi-square ($\chi^2$) distributed index ($T^2$) that can be used for an indication of the sensor condition degradation. This is represented by the equation:

Equation 14:

$$T^2 = \sum_{i=0}^{n} c_i^2$$

where the individual coefficients $c_i$ is $\chi^2$ distributed with n degrees of freedom. By specifying a confidence level $\alpha$, then we can have the following criteria for fault detection. The fault detection can be determined by comparing the obtained values within the relationships indicated below:

Equation 15:

$$T^2 \leq \sum_{i=0}^{n} c_i^2 \leq x^2(n-2, 1-\alpha) \text{ sensor defect free}$$

$$T^2 > \sum_{i=0}^{n} c_i^2 > x^2(n-2, 1-\alpha) \text{ sensor defective}$$

This provides a relationship between the different fault types and corresponding GC coefficients. This provides for the usage of the GC co-efficient parameters for classification of the specific type of sensor fault.

The system of this invention provides an effective and economical sensor fault detection system and method. The technique is useful for dealing with slowly occurring sensor faults such as drift and bias. Component models of the various components within the system are used as a basis for detecting the sensor bias in estimating the sensor drift. These component models are created using manufacturer's data that is obtained for each of the components. The models are then used to estimate bias occurring in the sensor readings. Data obtained from the sensor readings are then manipulated by a time scale transformation and statistical probability distribution function expansions are used to detect the non-drift type sensor faults. Combining the utilization of component models and two-fault detection approaches utilizing the time scale transformation and statistical probability distribution function expansions provide a reliable, adaptable way of evaluating current sensor health.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of diagnosing sensor fault for an air handling system comprising the steps of:
   a) creating a component model by producing a series of measurement values and determining an expected value for a sensor measurement by producing a probability density function for the series of measurement values;
   b) detecting an actual measurement by the sensor;
   c) comparing the expected value to the actual value including comparing the probability density function to a normal distribution;
   d) producing a low pass output and a high pass output with a time-scale and/or time frequency transformation;
   e) comparing the low pass and high pass output to a predefined threshold value; and
   f) determining a fault in the sensor responsive to a difference between the threshold value and the low pass and high pass output being greater than a desired value.

2. The method as recited in claim 1, comprising the step of performing an orthogonal statistical transformation on the probability density function.

3. The method as recited in claim 2, wherein orthogonal statistical transformation is a Gram-Charlier transformation.

4. The method as recited in claim 1, wherein said component model represents operation of a compressor.

5. The method as recited in claim 4, wherein said component model representing the compressor comprises the relationship, $$T_{dis} = T_{suc}\left(\frac{P_{dis}}{P_{suc}}\right)^{\frac{n-1}{n}}$$

where $T_{suc}$, $T_{dis}$, $P_{suc}$ and $P_{dis}$ are compressor inlet temperature, outlet temperature, inlet pressure, outlet pressure respectively and n is the polytropic index.

6. The method as recited in claim 4, wherein said component model representing the compressor comprises the relationship, $$\dot{W}_{Comp}=(e+fP_r^d)P_{suc}\dot{V}_{suc}+g,$$

$$\dot{V}_{suc}=A-BP_r^C$$

where $V_{suc}$ is the compressor suction volumetric flow rate, $P_r$ is the pressure ratio, $P_{suc}$ is the suction pressure, $\dot{W}_{Comp}$ is compressor power, and A, B, C, d, e, f, and g are constants provided by manufacturer's data.

7. The method as recited in claim 1, wherein said sensor is a pressure sensor sensing pressure at an inlet or outlet to the compressor.

8. The method as recited in claim 1, wherein said sensor is a temperature sensor sensing temperature at an inlet or outlet to a heat exchanger.

9. The method as recited in claim 1, wherein said component model represents operation of a heat exchanger.

10. The method as recited in claim 1, comprising the step of gathering a plurality of the determined differences and tracking those differences over time.

11. The method as recited in claim 10, comprising the step of predicting a future sensor condition based on the plurality of determined differences.

12. A method of diagnosing sensor fault for an air handling system comprising the steps of:
   a) creating a component model by producing a series of measurement values and determining an expected value for a sensor measurement by producing a probability density function for the series of measurement values;
   b) detecting an actual measurement by the sensor;
   c) comparing the expected value to the actual value including comparing the probability density function to a normal distribution;
   d) determining the probability density functions of the outputs from a time-scale transformation,
   e) comparing the determined probability density function with a predefined probability density function when a sensor is healthy, and determining sensor health condition based on the results of the comparison.

13. A method of diagnosing a sensor fault condition for an air handling system comprising the steps of:
   a) creating a component model that represents operation of a heat exchanger and determining an expected value for a sensor measurement, wherein said operation of said heat exchanger is represented by the equations;

$$\text{Air side: } Q = \frac{\dot{m}_1 c_{p1}(T_{1in} - T_{1out})}{SHR}$$

$$\text{Refrigerant side: } Q = \dot{m}_2(h_{r1} - h_{r2})$$

where Q=the rate of heat transfer, $\dot{m}_1$=mass flow rate of air, , $\dot{m}_2$=mass flow rate of refrigerant, $c_{p1}$=the specific heat of dry air, T=the temperature, SHR=the sensible heat ratio, $h_{r1}$, $h_{r2}$=specific enthalpies of refrigerant vapor at inlet and outlet of evaporator all in compatible units;
   b) detecting an actual measurement by the sensor;
   c) comparing the expected value to the actual value; and
   d) determining a fault in the sensor responsive to a difference between the expected value and the actual value greater than desired.

14. A method of diagnosing sensor fault for an air handling system comprising the steps of:
   a) creating a component model representing operation of a heat exchanger and determining an expected value for a sensor measurement, wherein a bias is estimated as the difference between a flow rate determined by a heat exchanger model and a flow rate determined by a compressor model;
   b) detecting an actual measurement by the sensor;
   c) comparing the expected value to the actual value; and d) determining a fault in the sensor responsive to a difference between the expected value and the actual value greater than desired.

15. A system for monitoring sensors for an air handling system comprising:

a controller comprising a component model representing operation of a heat exchanger for determining an expected value of a sensor measurement, wherein a bias is estimated as a difference between a flow rate determined by the component model and a flow rate from a compressor model, wherein said controller receives a measured value from a sensor that is compared to said expected value to determine a condition of said sensor.

16. The system as recited in claim 15, wherein said controller determines a difference between said expected value and said measured value and determines that a fault condition exists responsive to said difference meeting a desired criteria.

17. The system as recited in claim 15, wherein said controller comprises a database for producing a probability distribution based on a plurality of measured values from said sensor.

18. The system as recited in claim 17, wherein said controller determine a probability density function based on said plurality of measured values from said sensor and compares said probability density function to a normal probability distribution.

19. The system as recited in claim 15, wherein said component model comprises a representation of operation of a compressor.

20. The system as recited in claim 15, wherein said component model comprises a representation of operation of a heat exchanger.

21. The system as recited in claim 15, wherein said controller is separate from a controller of the air handling system.

22. The system as recited in claim 15, wherein said controller is an integral portion of a controller for the air handling system.

23. A system for monitoring sensors for an air handling system comprising:

a controller comprising a component model for determining an expected value of a sensor measurement, wherein said controller receives a measured value from a sensor that is compared to said expected value to determine a condition of said sensors, wherein said controller determines a probability density function based on a plurality of measured values from the sensor, performs a time scale statistical transformation on said probability density function, and compares said probability density function to a normal probability distribution.

24. The system as recited in claim 23, wherein said controller produces a low pass output and a high pass output with said time-scale statistical transformation and determines said condition of said sensor based on a comparison of said low pass and said high pass output to a desired threshold value.

* * * * *